(12) United States Patent
Ferrand et al.

(10) Patent No.: US 9,387,606 B2
(45) Date of Patent: Jul. 12, 2016

(54) VULCANIZING PRESS FOR TIRE BLANKS PROVIDED WITH INDUCTORS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Jean-Charles Ferrand, Clermont-Ferrand (FR); Jean-Claude Aperce, Clermont-Ferrand (FR); Alain Rochette, Clermont-Ferrand (FR); Didier Valentin, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 233 days.

(21) Appl. No.: 14/366,256

(22) PCT Filed: Dec. 12, 2012

(86) PCT No.: PCT/FR2012/052888
§ 371 (c)(1),
(2) Date: Jun. 17, 2014

(87) PCT Pub. No.: WO2013/093293
PCT Pub. Date: Jun. 27, 2013

(65) Prior Publication Data
US 2015/0086663 A1   Mar. 26, 2015

(30) Foreign Application Priority Data

Dec. 19, 2011  (FR) ..................... 11 61925

(51) Int. Cl.
*B29D 30/06* (2006.01)
*H01F 27/06* (2006.01)
(Continued)

(52) U.S. Cl.
CPC ................. *B29C 35/12* (2013.01); *B29C 33/06* (2013.01); *B29D 30/00* (2013.01);
(Continued)

(58) Field of Classification Search
CPC ........... B29D 30/0601; B29D 30/0662; B29D 2030/0674; B29C 33/06; B29C 35/12; B29C 2035/0811; H01F 27/06; H01F 27/24
USPC ......................................... 336/65
See application file for complete search history.

(56) References Cited

U.S. PATENT DOCUMENTS

| 4,599,061 A | * | 7/1986 | Manabe et al. | ......... B29C 33/06 219/618 |
|---|---|---|---|---|
| 5,622,669 A | | 4/1997 | Dailliez et al. | |

(Continued)

FOREIGN PATENT DOCUMENTS

| DE | 4343578 A1 | 6/1995 |
|---|---|---|
| EP | 0638409 A1 | 2/1995 |

(Continued)

OTHER PUBLICATIONS

PCT/FR2012/052888, International Search Report (ISR), Form PCT/ISA/210, dated Apr. 17, 2013 (including English translation), 6 pgs.

*Primary Examiner* — James Mackey
(74) *Attorney, Agent, or Firm* — Dickinson Wright PLLC

(57) ABSTRACT

The vulcanizing press for curing green tire blanks having:
a component,
at least one inductor comprising an armature having two free ends exhibiting soles which are able to close an electromagnetic loop through the component, and
for each sole, at least one connecting element connecting the sole to the component and forming between the two of them at least one space, the connecting element or elements associated with the sole occupying in total less than half of a length of the sole.

11 Claims, 2 Drawing Sheets

(51) Int. Cl.
  *B29C 35/12* (2006.01)
  *B29C 33/06* (2006.01)
  *H05B 6/10* (2006.01)
  *H05B 6/14* (2006.01)
  *B29D 30/00* (2006.01)
  *H01F 27/24* (2006.01)
  *B29C 35/08* (2006.01)
  *B29L 30/00* (2006.01)

(52) U.S. Cl.
  CPC ....... *B29D 30/0629* (2013.01); *B29D 30/0662* (2013.01); *H01F 27/06* (2013.01); *H01F 27/24* (2013.01); *H05B 6/105* (2013.01); *H05B 6/14* (2013.01); *B29C 2035/0811* (2013.01); *B29D 30/0601* (2013.01); *B29D 2030/0674* (2013.01); *B29L 2030/00* (2013.01)

(56) References Cited

U.S. PATENT DOCUMENTS

2002/0015746 A1\* 2/2002 Mitamura et al. .. B29C 35/0272
  425/50
2009/0308861 A1\* 12/2009 Okada et al. ............ B29C 33/06
  219/618

FOREIGN PATENT DOCUMENTS

| EP | 2065151 A1 | 6/2009 |
| JP | 5276742 A | 6/1977 |
| JP | 52129035 A | 10/1977 |
| JP | 62015504 A | 1/1987 |
| JP | 2005271336 A1 | 10/2005 |

\* cited by examiner

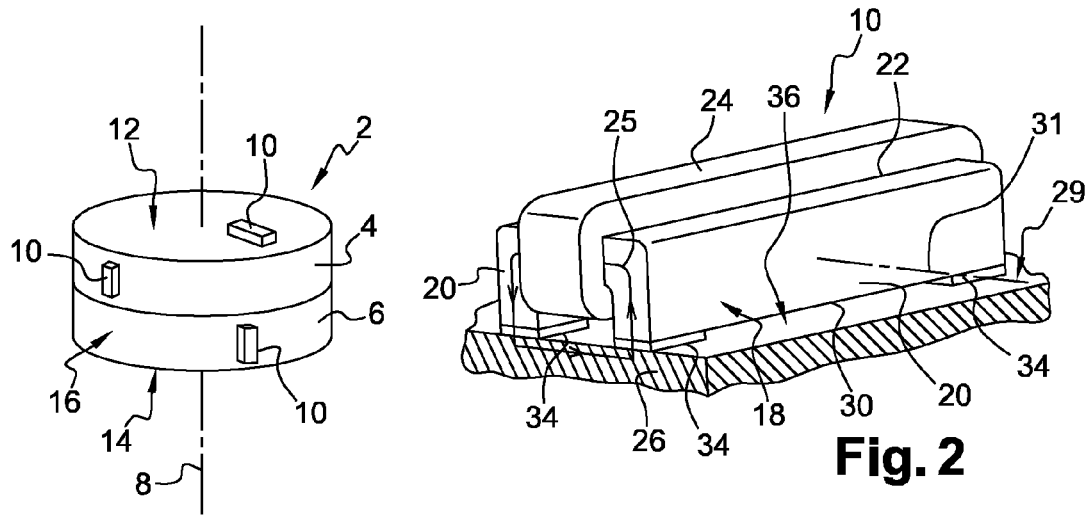
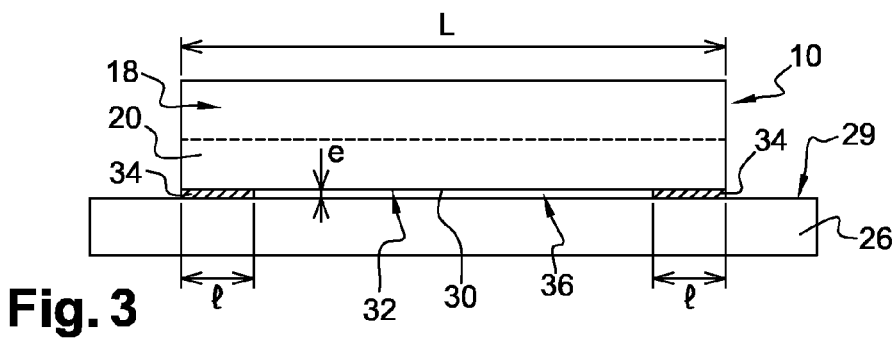
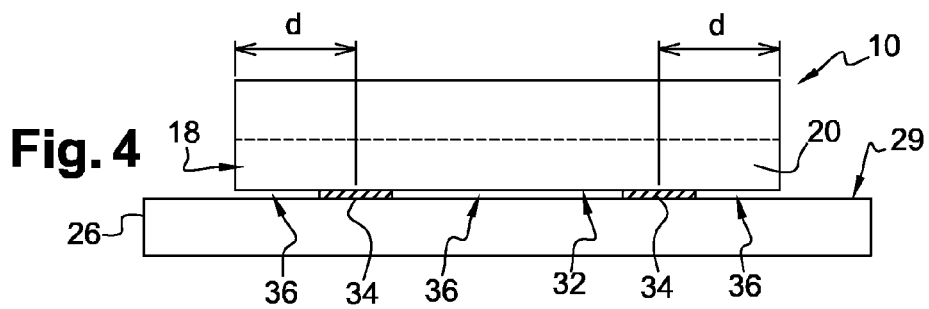
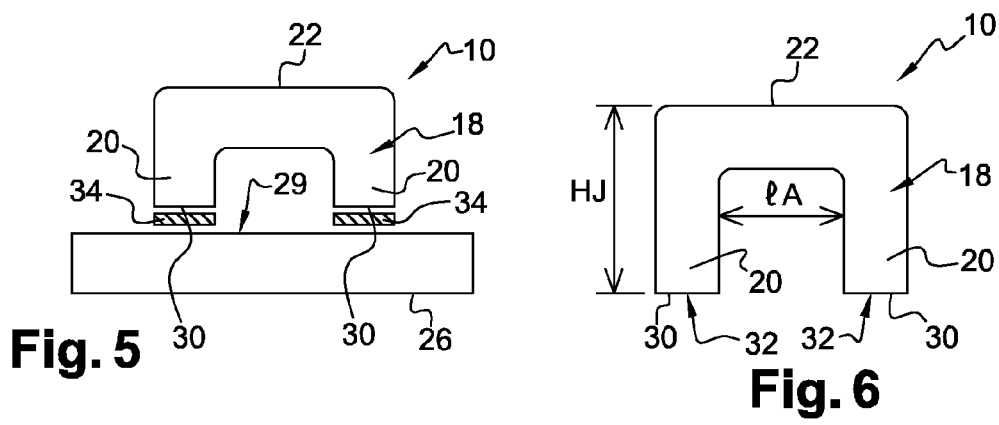

VULCANIZING PRESS FOR TIRE BLANKS PROVIDED WITH INDUCTORS

This application is a 371 national phase entry of PCT/FR2012/052888, filed 12 Dec. 2012, which claims benefit of FR 1161925, filed 19 Dec. 2011, the entire contents of which are incorporated herein by reference for all purposes.

BACKGROUND

1. Field

The disclosure relates to the manufacture of tires for vehicle wheels and in particular to the vulcanizing presses for curing green tire blanks.

2. Description of Related Art

In order to manufacture a tire for a wheel, a green tire blank is first of all created which comprises various elements of raw rubber and reinforcing elements. The green tire blank is then cured in a press to vulcanize the rubber and obtain the tire casing.

It is known practice, for example from document EP-0 638 409 in the name of the Applicant company, to heat the vulcanizing press using electromagnetic induction. In such a context, each inductor may be equipped with a metal armature made of magnetic sheet, sometimes referred to as electrical sheet, in the manner of transformers and the armatures of synchronous motors. Such inductors are used with alternating currents at relatively low frequencies of, for example, between 4 and 1000 hertz, to heat the components of the mold over a large proportion of their thickness. The armature bears a coil and has the shape of a U. In addition, in order effectively to complete the loop of the magnetic field through the component that is to be heated, the inductor is placed in contact therewith. However, this results in two disadvantages.

First of all, the component, which may reach a temperature of between 100 and 400° C., transmits a significant amount of heat to the armature which means that the coil, its insulators and its coatings have to be made from materials able to withstand high temperatures. The alternative is for the inductor to be fitted with cooling means. All of these solutions are very expensive.

In addition, under the effect of the variable magnetic field and of the magnetic hysteresis of the components that are to be heated, which is generally very much greater than that of the magnetic sheets, the inductor is subjected, at a frequency that is twice that of the supply voltage, to a force of attraction and then to a force of repulsion that tends to move it away from the component that is to be heated. This phenomenon may generate movements and impacts of the inductor against the component liable to generate noise in excess of 80 decibels. It also generates wear on those surfaces of the armature that strike the component. Now, the noise constitutes a nuisance to persons in the vicinity and the wear ultimately leads to replacement of the inductors, representing a significant cost and causing production down-time. Admittedly, the inductor can be held firmly against the component using various devices such as springs or pneumatic or hydraulic rams. However, these solutions are expensive without always being effective.

Furthermore, the armatures are built to follow the shape of the component that is to be heated and have planar soles in contact with a planar surface of the component. Nevertheless, the component is heated on just one face, which causes within it an asymmetric expansion that gives it a curved shape. Once that happens, the armature is no longer in stable contact with the component and is pressed against the latter only at the vertex of the curved part. It is therefore liable to move even more by rolling and rocking along its length against the curved part, thereby aggravating the phenomena of noise and of wear. This asymmetric thermal expansion explains why the noise may be low at the start of heating and then reach high values when the temperature of the heated face of the component has increased significantly.

SUMMARY

It is one object of embodiments of the invention to reduce the temperature of the inductor and the noise and wear.

To this end, embodiments of the invention provide a vulcanizing press for curing green tire blanks, which comprises:
   a component,
   at least one inductor comprising an armature having two free ends exhibiting soles which are able to close an electromagnetic loop through the component, and
   for each sole, at least one connecting element connecting the sole to the component and forming between the two of them at least one space, the connecting element or elements associated with the sole occupying in total less than half of a length of the sole.

Thus, the reduced surface area of the connecting element or elements compared with that of the sole slows and limits the transmission of heat from the component to the armature. In addition, the space between the sole and the component limits the area of contact between the two. Under such conditions, if the inductor begins to vibrate under the effect of the supply voltage, it is less likely to strike the component. The noise and wearing of the surfaces of the armature that are in contact with the component are thus limited. This is particularly the case for the curved part of the component which is less likely to be struck by the inductor.

For preference, the or each space is occupied only by air.

Thus, the air space allows effective insulation of the sole from the hot component.

For preference, the press for each sole comprises two separate connecting elements.

Thus, while at the same time limiting their area of contact, the inductor is kept stable on the component. The possibilities of vibrating are also considerably limited.

Nevertheless, when the inductor and the component to be heated have a significant length, for example in excess of 300 mm, and the connecting elements are contiguous with the ends of the sole, two additional unfavourable phenomena may arise. The first is that the deflection adopted by the component under the effect of the asymmetric thermal expansion may exceed the height of the connecting elements, i.e. the thickness of the space, and thus recreate noise and wear. The second is that the alternating electromagnetic forces may lead to alternating deformations of the armature with a significant amplitude, for example in excess of 0.1 mm, and cause it to collide with the curved part of the component which, once again, recreates the noise and the wear.

This is why, for preference, the or each connecting element extends away from the longitudinal ends of the sole.

Specifically, such a positioning reduces the deformation of the inductor and the deflection of that portion of the component that extends between the connecting elements. This reduces, or even eliminates, the aforementioned noise and the aforementioned wear.

Advantageously, the or each connecting element extends away from a centre of the sole.

Provision may be made for at least one of the connecting elements of the inductor to be of one piece with the armature.

Provision may also be made for at least one of the connecting elements of the inductor to be of one piece with the component.

These last two provisions simplify the mounting of the inductor on the component because the connecting element is incorporated into the inductor or into the component. However, it is often the case that these connecting elements end up wearing out, which then means that the entire armature or the entire component that is to be heated has to be replaced or remachined.

This is why, for preference, provision is made for at least one of the connecting elements to form a member independent of the armature and of the component.

Thus, this wearing component can be easily replaced independently of the armature and of the component that is to be heated.

Advantageously, at least one of the connecting elements is made of aramid.

This is because aramids exhibit two advantages: they absorb a large amount of vibrations and are able to slow the transfer of heat from the component to the armature.

For preference, the armature comprises a core and two legs the free ends of which exhibit the soles, the armature being such that:

$$H_J \geq 1.1 \times I_A$$

where:
- $H_J$ denotes a height of each leg measured from the sole up to a face of the armature that is the opposite face to the sole; and
- $I_A$ denotes a width of the core measured between the two legs.

Thus, the armature is given particularly long legs, as this keeps a large part of the inductor away from the component that is to be heated and therefore slows the transfer of heat from the one to the other. In other words, the temperature seen by the coil is reduced. This measure also encourages convective cooling of the armature and of the coil. In addition, if the armature does not need to be in permanent contact with the component, this arrangement means that the armature is subjected to particularly pronounced transient thermal conditions. The elongation of the legs therefore increases the time needed for the heat to reach as far as the coil, thus making it possible to reduce the maximum temperature that the latter is likely to attain.

The invention, in certain embodiments, also provides an inductor which comprises:
- a coil, and
- an armature having two free ends exhibiting respective soles, each sole bearing at least one connecting element extending as a projection from the sole so that the connecting element or elements occupy in total less than half a length of the sole.

SUMMARY

We shall now set out a number of embodiments of a vulcanizing press according to embodiments of the invention, with reference to the attached drawings in which:

FIG. 1 is a perspective view of a vulcanizing press for a tire according to an embodiment of the invention;

FIGS. 2 and 3 are views of one of the inductors which is fixed to the press of FIG. 1; and FIGS. 4 to 7 illustrate other embodiments of the press.

DETAILED DESCRIPTION OF SPECIFIC EMBODIMENTS

Figure 7:
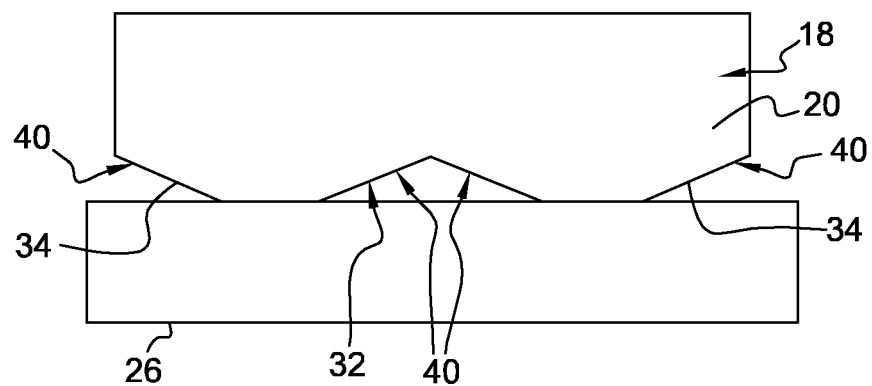

FIGS. 1 to 3 illustrate a press 2 used for curing green tire blanks for wheels. These tires are intended for example for vehicles of the light vehicle type, passenger cars, utility vehicles, heavy vehicles or even construction plant machinery.

The press 2 comprises two parts, an upper part 4 and a lower part 6, which are able to move in sliding relative to one another in the vertical direction which is that of a main axis of symmetry 8 of the press, in order to open and close the press. These parts contain mold portions that are used to give the tire its definitive shape when the green tire blank is being vulcanized.

To this end, the press is equipped with inductors 10 arranged against various parts of the press, on the external faces thereof, in order to afford the heat necessary to vulcanize the rubber which forms most of the green tire blank held in the press. Provision may thus be made for one or more inductors to be positioned against an upper 12 or lower 14 horizontal face of the press or even against a vertical lateral face 16 thereof.

All of the inductors here are of the type illustrated in detail in FIGS. 2 and 3. The inductor 10 comprises a metal armature 18 having a profiled elongate shape of U-shaped cross section. It thus comprises two legs 20 corresponding to the branches of the U and extending parallel to one another and a core or middle 22 joining two ends of the legs to one another. The armature is made of metal and produced from magnetic sheet.

The inductor further comprises a coil 24 of axis 31 formed by winding one or more electrically conducting wires around the core 22 and between the two legs 20. In operation, this coil is supplied with electric current by a current source, not depicted, and in the conventional way. This supply of power causes a magnetic flux 25 to be set up in the coil and in the armature forming an electromagnetic loop through the component 26 of the mold against which component the inductor is placed. This magnetic field causes Eddy currents to appear in the component and these, through a Joule-heating effect, heat the component and then, by electrical conduction through the mold, heat the green tire blank.

The two legs 20 extend from the two axial ends of the coil 24 which form the poles thereof and towards the component 26. The part of each leg that is closest to the component is formed by its free end 30 which has a planar sole 32. The soles are coplanar and extend facing and distant from the component 26, parallel to the external face 29 thereof.

Interposed between the component and each sole are two connecting elements 34, in this instance identical to one another. Each element 34 here takes the form of a rectangular parallelepiped of small thickness, this thickness e being measured in the direction from the component 26 to the inductor. The two connecting elements associated with one and the same sole are contiguous with the respective longitudinal ends of the sole. They have the same width thereas so that three of the four lateral faces of each connecting element are coplanar with the respective faces of the armature.

The two elements 34 are separate so that they are completely distant from one another and leave between them a space 36 occupied only by air, extending across the entire width of the sole and in which the sole extends facing the component 26 and distant therefrom. The two connecting elements 34 also extend away from a centre of the sole and from a central portion thereof.

The longest dimension of each leg consists of its length L measured at right angles to the direction extending from the component to the inductor and at right angles to the axis 31. The two connecting elements occupy in total less than half of this length. In other words, the sum 2l of their respective lengths/is less than half this length. In this particular instance, the two connecting elements occupy approximately one third of the length L of the leg. The space 36 therefore on its own occupies more than half the length of the leg and in this particular instance more than two thirds thereof.

It is therefore the four connecting elements which by themselves provide the interface between the inductor and the component 26. Provision may be made for the connecting elements to be produced as one piece with the respective legs 20 by projecting out from the corresponding soles 32. Conversely, provision may be made for them to be produced as one piece with the component 26, therefore projecting out from the face 29.

Such an arrangement makes it possible to limit the transfer of heat from the component 26 to the inductor 10. Specifically, a transfer of heat by conduction can take place only through the connecting elements 34. To this end, steps may even be taken to ensure that the connecting elements represent a small fraction of the interface between the legs and the component and, for example, just 10 of the corresponding surface area. In order not to reduce the effectiveness of the induction, it is preferable for the thickness e of the space 36 to remain small and for example to be comprised between 0.1 and 1 mm.

Positioning, as has been done in this instance, the connecting elements 36 at the ends of the soles gives the armature a very firm seating on the component. Moreover, it was explained above that the external face of the component 26 could adopt a curved shape under the effect of the asymmetric expansion. This embodiment limits the possibilities for contact between the armature and this curved face or even entirely eliminates them in many cases, thus preventing impacts between them as well as preventing noise and wear.

Nevertheless, when the inductor and the component are of significant length, there are two undesirable phenomena that may arise in such a configuration. Firstly, the deflection adopted by the component may exceed the thickness e and therefore once again generate noise and wear. Secondly, the alternating electromagnetic forces may lead to alternating deformations of the armature of which the legs and, in particular, the soles 30 successively adopt a convex or concave shape rather than the rectilinear planar shape visible in FIG. 3. These deformations, which may be of significant amplitude and, for example, of an amplitude in excess of 0.1 mm, may cause collisions with the curved face of the component, thus again generating noise and wear.

It is in order to overcome this that the embodiment of FIG. 4 is proposed. The latter embodiment is in all respects similar to that of FIG. 3 except as far as the position of the connecting elements 34 is concerned, these elements this time being positioned distant from the ends of the sole 30. The distance here is greater than the length/of each element. The length of the space 36 separating the two elements nevertheless remains greater than the sum 2l of the length of the two elements. In this particular instance, the centre of each connecting element is situated a distance d from the nearest end of the sole which distance is equal to one quarter of the length L.

In this configuration, there are thus formed, between each sole 30 and the component 26, three spaces 36 which follow on from one another along the length of the sole and are separated by the respective connecting elements. Once again, the latter elements occupy in total less than half the length of the sole, are separate and extend away from the centre of the sole.

This arrangement reduces the possibilities of deformation of the inductor and the deflection of the component that is to be heated, this deflection being limited to the space 36 separating the two connecting elements. Any possibility of collision between the armature and the component and therefore the ensuing noise and wear is limited or even eliminated.

In the embodiment of FIG. 5, the inductor is identical in all respects to that of FIG. 3 or as an alternative to that of FIG. 4 except that the connecting elements 34 each form an independent wearing component separate both from the component 26 and from the armature 18. Specifically, in the preceding embodiments, the connecting elements ultimately become worn. By creating these elements here in the form of independent wearing components, they become far easier to replace.

These components may be made from any nonmagnetic materials such as: nonmagnetic stainless steel, brass, aluminium, a filament or a textile (woven or nonwoven) of meta-aramid or of para-aramid. Aramids are particularly advantageous because they have two advantages: they absorb vibrations and slow the transfer of heat from the component 26 to the armature. Likewise, ductile materials may also be used as preferential wearing components.

The connecting elements 34 may be fixed rigidly to the inductor and to the component 26 by any method suitable to such a context, for example by screwing, riveting, clipping, stitching, lacing or even by heat-resistant bonding (notably using a paste containing graphite or silicone).

In the embodiment of FIG. 6 which is also compatible with the preceding embodiments, the press differs from that of FIG. 3 only in terms of the dimensions and shape of the armature. The height of each leg 20 measured from the sole 32 to the opposite face of the armature which is the upper face in the figures is denoted $H_J$. The width of the core 22 of the armature measured as the distance between the two legs 20 is also denoted by $I_A$. In the preceding embodiments, $H_J$ was less than or equal to $I_A$. In this particular instance, $H_J$ is greater than or equal to $1.1 \times I_A$. In this particular instance, the height of the legs even equals one and half times the width of the armature.

In this embodiment, the legs 20 have therefore been lengthened in the direction perpendicular to the plane of the sole so as to move the core 22 and the coil as far as possible away from the component that is to be heated. That reduces the temperature seen by the coil by limiting and slowing the transfer of heat from the component as far as the core and coil. This arrangement also increases the cooling of the armature by convection between the legs.

In the embodiment of FIG. 7, which shows one of the legs 20 of the armature, the connecting elements 34 are made as one piece with the respective legs 20. In addition, the sole 32 of the leg has a non-planar shape. In this example, this shape is such that the sole widens from each connecting element, adopting, starting from each of these, two planar faces 40 which are slightly inclined relative to one another and in this instance symmetric with respect to one another. As in this instance there are two connecting elements per leg, there are four faces 40 per sole 32. These faces 40 mean that the wearing of the connecting elements or bearing surfaces can be managed because as these elements 34 begin to wear, their area of contact with the component increases, thus slowing the rate of wear.

The invention, in an embodiment, is inexpensive to implement and allows the noise generated by the inductors to be brought down to under 70 decibels.

Of course, numerous modifications could be made to the invention without departing from the scope thereof.

It may be conceivable to connect at least one of the soles to the component 26 using a single connecting element or, on the other hand, using three or more connecting elements.

In order to limit the transfer of heat from the component 26 to the inductor without seeking to obtain all of the aforementioned advantages in terms of noise reduction, it may be possible to plan to interpose between them one or more fixing elements without requiring these to occupy in total less than half of a length of the sole but ensuring that they occupy less than half the surface area of the sole.

Moreover, it may be possible to conceive of an armature in which $H_J$ is greater than or equal to $1.1 \times I_A$ without planning to adhere to the aforementioned dimensional conditions associated with the connecting elements.

The connecting elements could have a shape other than that of a rectangular parallelepiped, for example that of a disc or of a star.

The invention, in an embodiment, can be implemented in some context other than that of a vulcanizing press for curing a green tire blank, i.e. it may be applied to any inductor intended to heat a metal component.

The invention claimed is:

1. A vulcanizing press for curing green tire blanks, characterized in that it comprises:
    a component,
    at least one inductor comprising an armature having two free ends exhibiting soles which are able to close an electromagnetic loop through the component, and
    for each sole, at least one connecting element connecting the sole to the component and forming between the two of them at least one space, the connecting element or elements associated with the sole occupying in total less than half of a length (L) of the sole.

2. The press according to claim 1, wherein the or each space is occupied only by air.

3. The press according to claim 1, wherein each sole comprises two separate connecting elements.

4. The press according to claim 1, wherein the or each connecting element extends away from longitudinal ends of the sole.

5. The press according to claim 1, wherein the or each connecting element extends away from a centre of the sole.

6. The press according to claim 1, wherein at least one of the connecting elements of the inductor is of one piece with the armature.

7. The press according to claim 1, wherein at least one of the connecting elements of the inductor is of one piece with the component.

8. The press according to claim 1, wherein at least one of the connecting elements forms a member independent of the armature and of the component.

9. The press according to claim 1, wherein at least one of the connecting elements is made of aramid.

10. The press according to claim 1, wherein the armature comprises a core and two legs the free ends of which exhibit the soles, the armature being such that:

$$H_J \geq 1.1 \times I_A$$

where:
    $H_J$ denotes a height of each leg measured from the sole up to a face of the armature that is the opposite face to the sole; and
    $I_A$ denotes a width of the core measured between the two legs.

11. An inductor, comprising:
a coil, and
an armature having two free ends exhibiting respective soles, each sole bearing at least one connecting element extending as a projection from the sole so that the connecting element or elements occupy in total less than half a length (L) of the sole.

* * * * *